Figure 1:
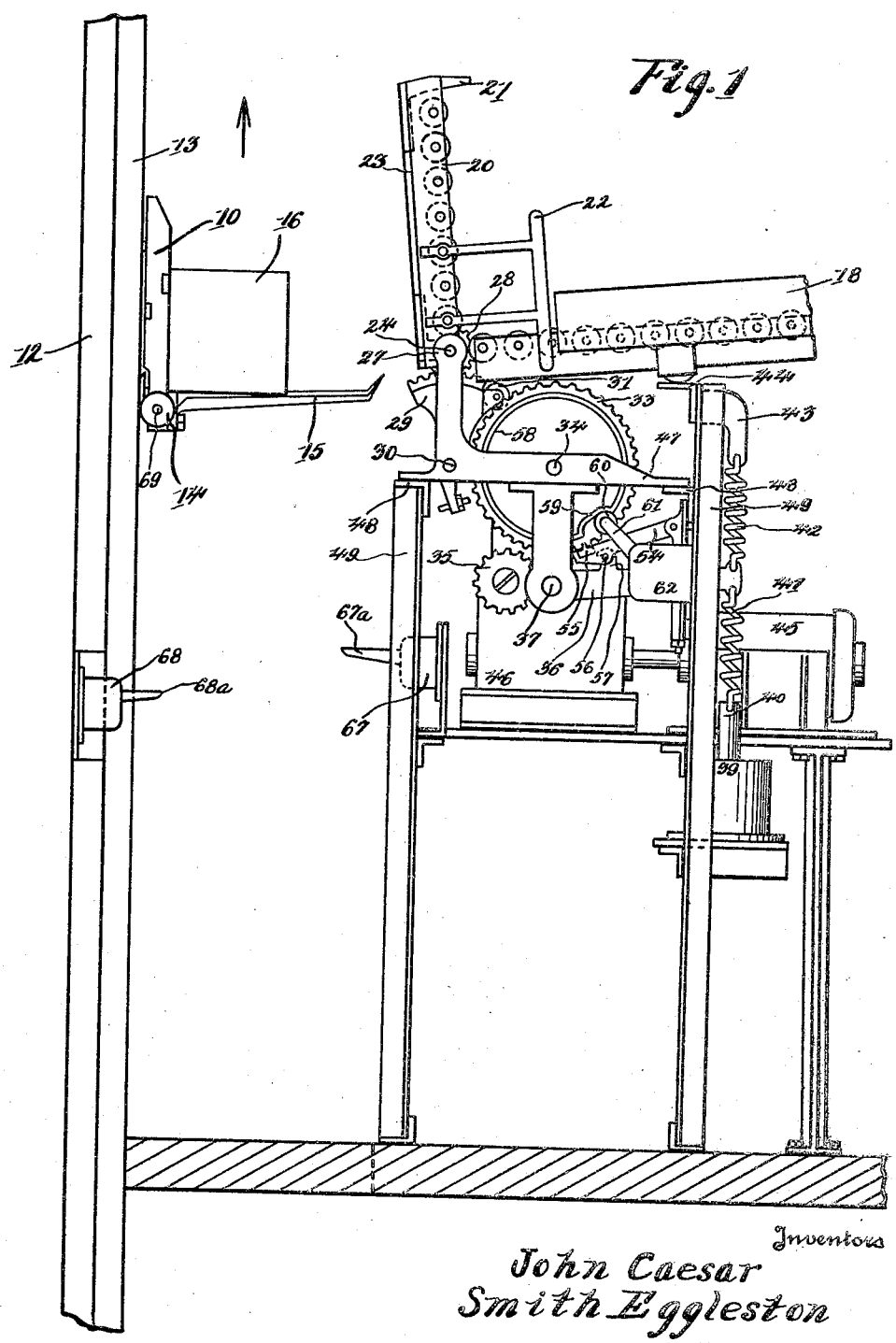

Fig. 2

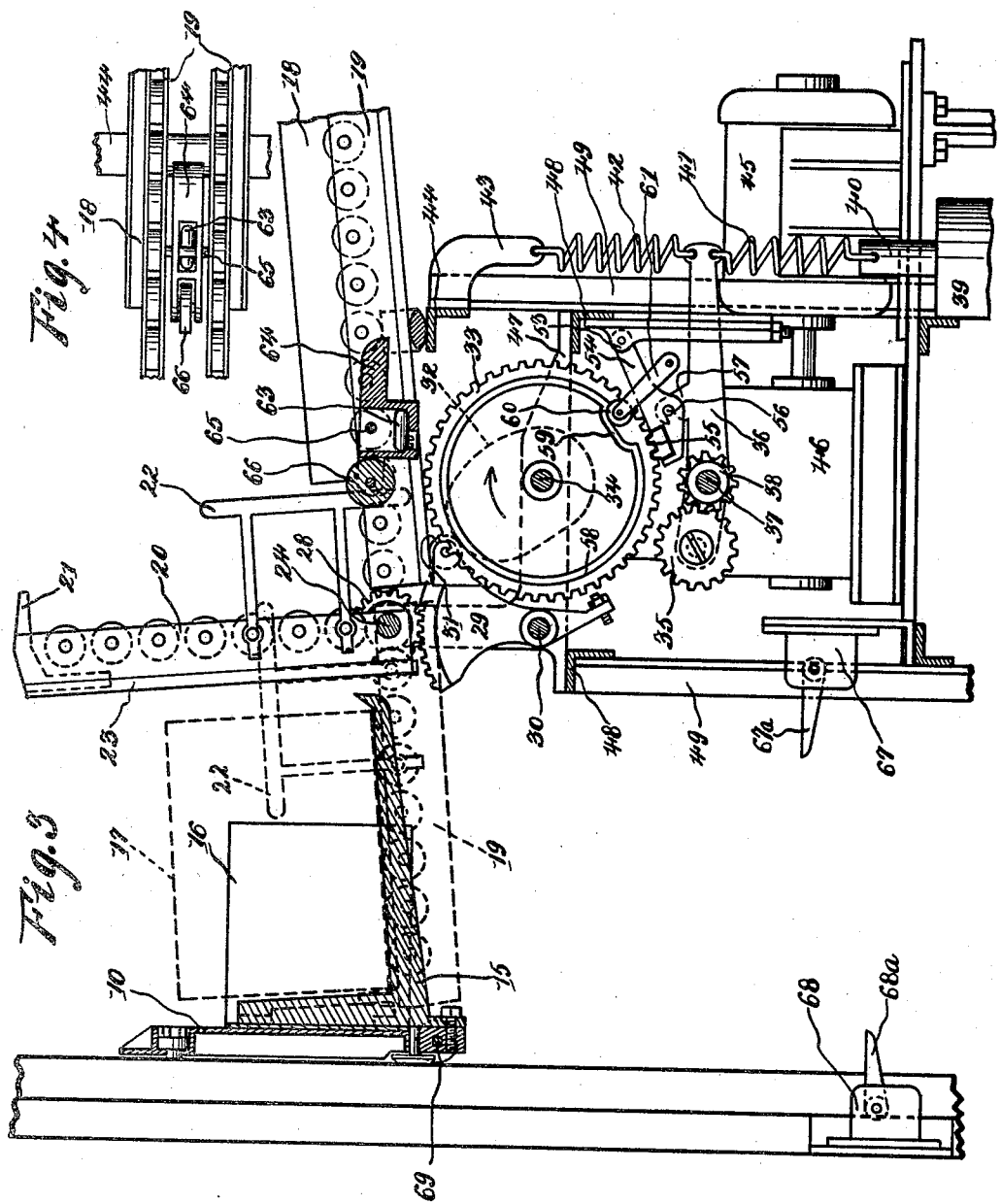

Sept. 27, 1932.  J. CAESAR ET AL  1,879,073
AUTOMATIC TRANSFER APPARATUS FOR CONVEYERS
Filed Sept. 22, 1930  4 Sheets-Sheet 4
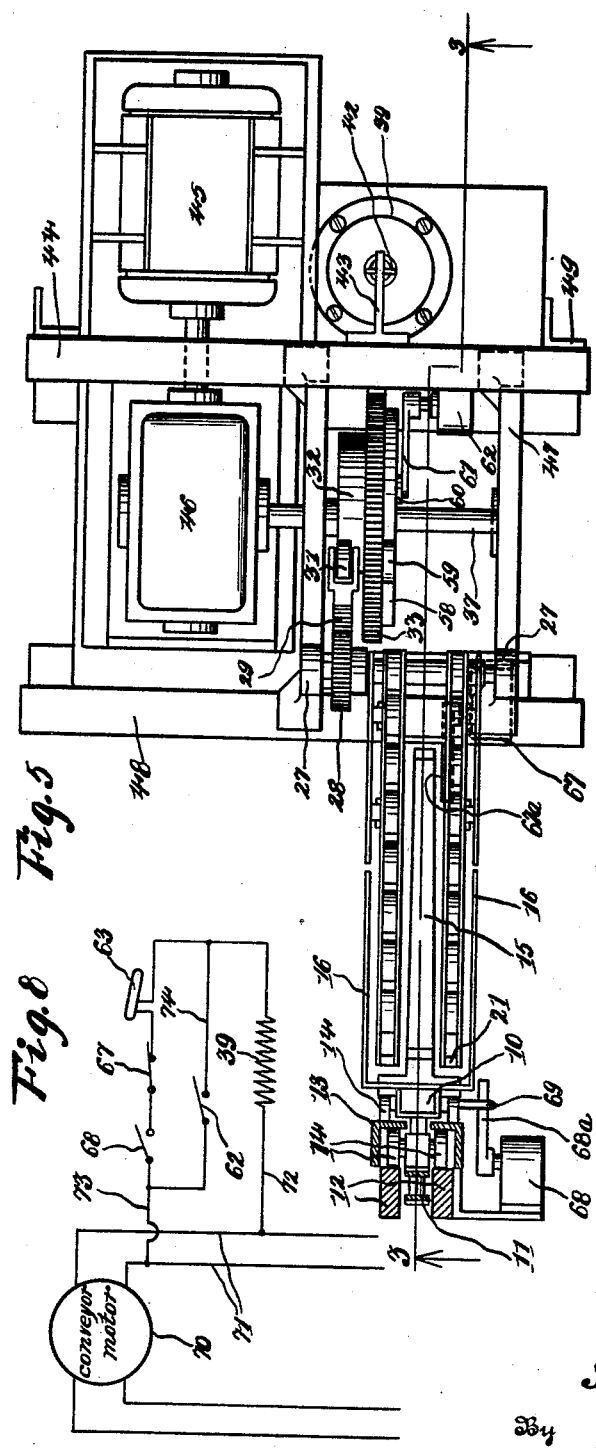
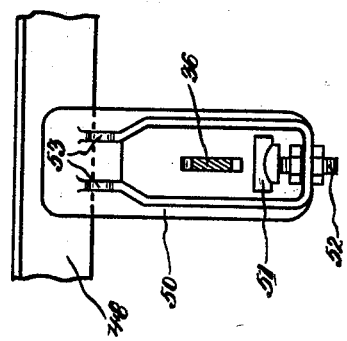
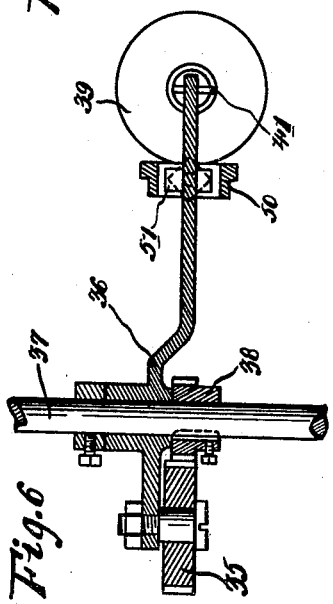
Inventors
John Caesar
Smith Eggleston
By Stryker & Stryker
Attorneys Patented Sept. 27, 1932

1,879,073

UNITED STATES PATENT OFFICE

JOHN CAESAR AND SMITH EGGLESTON, OF ST. PAUL, MINNESOTA, ASSIGNORS TO STANDARD CONVEYOR COMPANY, OF NORTH ST. PAUL, MINNESOTA, A CORPORATION OF MINNESOTA

AUTOMATIC TRANSFER APPARATUS FOR CONVEYERS

Application filed September 22, 1930. Serial No. 483,622.

This invention relates to automatic transfer apparatus for loading or unloading conveyers or elevators of the type having a series of carriers propelled by suitable power-driven means along a determined path.

It is our object to provide novel and efficient means for advancing goods to or from the path of a carrier at the proper time for loading or unloading. More particularly, it is our object to provide novel, electrically controlled apparatus of this kind having power-driven actuating mechanism for imparting to the load actuating element a cycle of operation during which said element is moved from a retracted, inoperative position, in which it is normally locked, forward to operative position and back again to locked position.

A further object is to provide transfer apparatus of this general character adapted to be driven by a motor independently of the conveyer but having means to coact with the conveyer for properly timing the loading operation.

Another object is to provide transfer apparatus arranged to be placed in groups or rows at the several floors or stations and adapted to be driven from a common motor to load or unload a series of conveyers which are driven independently of the transfer devices.

A still further object is to provide novel mechanism for maintaining transfer apparatus of this kind in proper timed relation to the conveyer where the conveyer is driven independently of the transfer apparatus but is controlled by movement of carriers along the conveyer. The invention also includes certain other novel features of construction which will be more fully pointed out in the following specification and claims.

Figure 2:
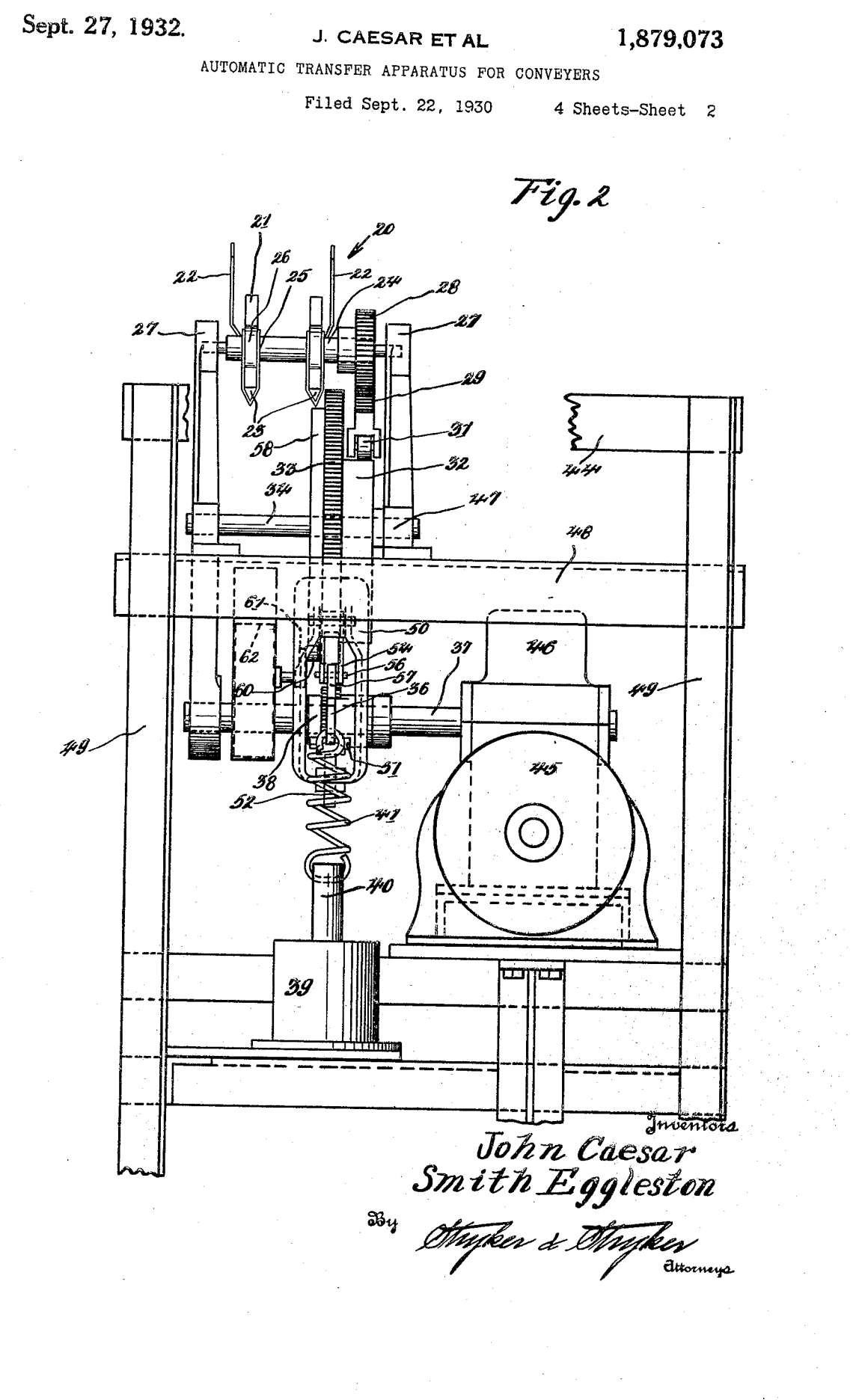

In the drawings, which illustrate the preferred embodiment of our invention at a loading station, Figure 1 is a side elevation of the loading apparatus together with adjacent portion of the conveyer; Fig. 2 is a front elevation of the same with a portion of the frame and branch conveyer removed for clearness; Fig. 3 is a central vertical section through the loading apparatus taken on the line 3—3 of Fig. 5 and with the movable section retracted; Fig. 4 is a plan view of a fragmentary portion of the branch conveyer and electric switch mounted thereon; Fig. 5 is a plan view of the transfer apparatus with the branch conveyer removed for clearness; Fig. 6 is a central horizontal section through the clutch arm and gears; Fig. 7 is a rear elevation of the clutch arm stop and support therefor and Fig. 8 is a diagrammatic illustration of suitable electric circuits and control switches for the solenoid.

In the drawings our improvements are illustrated in connection with an elevator having a carrier 10 secured to an endless chain 11 (Fig. 5) which may be continuously moved upward between guides 12. Parallel guides 13 project from the guides 12 for engagement with suitable rollers 14 on the carriers. Projecting from the carrier is an arm 15 for supporting the boxes or other articles or goods to be conveyed and the goods are confined between side members 16 of the conveyer. The carriers are loaded as they pass upward along the guides.

As shown in Fig. 3, boxes 17 containing the goods are delivered to the loading apparatus from a branch of feed conveyer 18, preferably of the inclined, gravity type, having small anti-friction wheels mounted in spaced channel members 19. At the delivery end of the feed conveyer 18 a movable section 20 is arranged to receive the boxes from said feed conveyer and is extensible from the retracted position shown in Figs. 1 and 3 to the extended position shown in Fig. 5 and in dotted lines in Fig. 3. A stop 21 projects into the path of the boxes at the normally free end of the section 20 and guide rails 22 project upward from the sides of said section to direct the boxes between the sides 16 of the carriers. Parallel bars 23 are fixed at one end on a pivot shaft 24 and extending along the bars 23 is a pair of channel members 25 each supporting a series of anti-friction rollers 26 over which the boxes pass toward the conveyer to be loaded. As best shown in Fig. 2, the shaft 24 is journaled at its ends in standards 27 and is provided with a pinion 28 adapted to be rotated to extend and retract the movable section 20.

Meshing with the pinion 28 is a gear segment 29 pivotally supported on a shaft 30. This gear segment carries an anti-friction roller 31 which rests on the periphery of a cam 32. The cam 32 is rigidly secured to the face of a large gear 33 revoluble on a shaft 34. To drive the gear 33 a pinion 35 is mounted on an arm 36 which, as best shown in Fig. 6, has a pivot bearing on a power-driven shaft 37 carrying a pinion 38 in continuous mesh with the pinion 35. The arm 36 is adapted to be actuated by a solenoid 39 having a plunger 40 connected to the arm by a coiled spring 41. A second coiled spring 42 is arranged above the arm 36 to normally raise the plunger 40 and retain the pinion 35 out of mesh with the gear 33. The upper end of the spring 42 is secured to a bracket 43 projecting from a transverse frame member 44. The spring 41 is somewhat stiffer than the spring 42 so that when the solenoid 39 is energized the plunger 40 will be drawn downward to move the pinion 35 into mesh with the gear 33 against the action of the spring 42.

The power-driven shaft 37 may be employed to drive other or additional loading apparatus, like that illustrated, and may be driven by a motor 45 through suitable speed reducing gears in a housing 46.

The shaft 34 is supported in a suitable stationary frame consisting of a pair of bars 47 secured to parallel angle bars 48, the latter, in turn, being secured to the main uprights or legs 49. Rigidly depending from one of the angle bars 48 is a loop-shaped casting 50 (Figs. 2, 3 and 7) for supporting a stop 51 for the arm 36. This stop is adjustably supported on a vertical bolt 52 supplied with lock nuts for securing it in place. Ears 53 project from the upper part of the casting 50 to support a brake arm 54, a pivot pin being inserted through said ears and arm. A brake shoe 55, preferably constructed from suitable fibre, is mounted on the arm 54 to engage the teeth on the gear 33 and the brake arm is arranged to be actuated by connection with the arm 36. The connection consists of a pin 56 projecting from the brake arm to engage in a slotted ear 57 formed on the arm 36. When the solenoid 39 is energized the arm 36 is actuated to withdraw the brake shoe 55 from the teeth on the gear 33.

One face of the gear 33 is formed with a cam 58 which has a circular periphery except for a depression therein to engage a roller 60 on a switch arm 61. An electric switch 62 is actuated by the arm 61 and is arranged to be held in open position when the roller 60 is engaged in the depressed portion 59 of the cam 58 and to be retained in closed position when said roller is in engagement with the circular periphery of the cam 58.

As shown in Figs. 3 and 4, an electric switch 63 (of the type known as a "mercoid"), is mounted on a tiltable support 64 having a pivot 65 extending between the channels 19 of the feed conveyer. At one end of the support 64 a small roller 66 is mounted to project into the path of the boxes or goods on the feed conveyer. The opposite end of the support 64 is weighted so that the roller 66 normally projects and the switch 63 is normally held in open position. The roller 66 is arranged to be depressed by a box to thereby tilt the support 64 and close the switch 63. Another switch 67 (Figs. 1, 3 and 5) has an actuating arm projecting into the path of the boxes 17 as they are moved upward by the carriers 10. The arm 67a of this switch is disposed at one side of the arm 15 on the carrier so that the switch is not actuated when an empty carrier passes the same. As best shown in Fig. 5, opposite the switch 67 on the elevator frame is mounted a switch 68 having an arm 68a adapted to be struck by a projecting pin 69 on the carrier 10. The switch 68 is normally open and is closed when a pin 69 on a carrier engages the arm 68a.

In the wiring diagram, illustrated in Fig. 8, the conveyer motor is indicated by the numeral 70 and is of the two-phase type having current supply wires 71. Current for actuating the solenoid 39 is supplied through wires 72 and 73 respectively connected to the supply wires 71. The several switches 63, 67 and 68 are arranged in series in a circuit including the wire 73 while the switch 62 is in a shunt circuit 74 for said first mentioned switches so that the solenoid 39 is energized when the switch 62 is closed or when the switches 63, 67 or 68 are closed.

*Operation*

In operation the carriers 10 are continuously moved upward past the loading station and the shaft 37 may be continuously driven together with the pinions 38 and 35 by the motor 45. The movable loading section 20 is normally in the retracted or elevated position shown in Figs. 1 and 3 so that boxes supplied by the feed conveyer 18 are stopped by the movable section in position to depress the roller 66 and thereby close the mercoid switch 63.

Assuming that a box is on the feed conveyer 18 in position to close the switch 63 and a carrier is approaching the loading station from beneath, the projecting pin 69 on the carrier engages the switch arm 68a and closes the switch 68 for a short period of time. If the switch 67 is not simultaneously actuated to open position by a load on the carrier, the closing of the switch 68 will cause the solenoid 39 to be energized. When the solenoid 39 is energized, the plunger 40 is drawn down and actuates the arm 36 to raise the pinion 35 into mesh with the gear 33 and to simultaneously withdraw the brake shoe 55 from engagement with the gear. The gear 33 and cams 32 and 58 are thus rotated and as soon as rotation starts (in the direction indicated by an arrow in Fig. 3) the switch arm 61 is actuated to close the switch 62 and shunt the circuit, including the switches 63, 67 and 68. Now the supply of current to the solenoid 39 is continued while the gear 33 makes a complete revolution, assuming, of course, that the supply to the conveyer motor 70 is not cut off.

In the normal operation the supply of current to the solenoid continues while the gear 33 makes substantially a complete revolution together with the cams 32 and 58. Rotation of the cam 32 in the direction indicated by an arrow in Fig. 3 allows the roller 31 on the gear segment 29 to swing in an arc toward the shaft 34. This permits rotation of the shaft 24, carrying the movable section 20 in such direction as to extend said section, under the action of gravity, into the path of the approaching empty carrier. The waiting box on the conveyer 18 now passes to the dotted line position shown in Fig. 3 and is thereupon picked up by the arm 15 on the carrier 10.

It will be noted that the cam 32 permits the movable section 20 to dwell in its extended position for a substantial part of the cycle of operation and for a sufficient period of time for the extended boxes to be picked up by the carrier. After removal of the box, the movable section 20 is retracted by the action of the cam 32 and gear segment 29 which rotates the pinion 28 in the proper direction and until the station is in the elevated position. As the section 20 approaches its elevated position, the roller 60 on the arm 61 moves into the depression 59 on the cam 58 to open the shunt circuit 74 with the result that the solenoid is deenergized and the spring 42 returns the arm 36 to position where the pinion 35 is withdrawn from mesh with the gear 33 and the brake shoe 55 is moved into engagement with the teeth on the gear. The cycle is thus completed.

It will be noted that the cam 32 positively returns the movable section to inoperative position and that the station is normally locked in said position so that it can not interfere with the carriers. The cam further promotes smooth operation and is designed to give the desired dwell to the movable section for loading and at the same time to cause a quick movement both to and from extended position.

By connecting the solenoid with the supply circuit for the conveyer motor, we cause the loading operation to stop simultaneously with the stopping of the conveyer and thereby retain the loading apparatus in proper timing to prevent interference. Where a number of carriers are secured to the conveyer chain they are placed at sufficient distance apart to permit the loading apparatus to complete a cycle of operation during the period between the arrival of successive carriers at the switches 67 and 68.

In the foregoing specification we have particularly described the invention as applied to a loading station, but by obvious rearrangement of the essential mechanism the device may be employed at an unloading station to transfer the articles from the main conveyer to a branch conveyer or unloading point. In the latter case, the transfer mechanism may be located adjacent to the descending run of the conveyer, the switches 67 and 68 being placed above instead of below the station, and the branch conveyer and movable section arranged to slope away from the main conveyer instead of toward it.

Our transfer mechanism is adapted for use with a number of conveyers which may be loaded (and/or unloaded) by a series of the transfer devices driven from a common source of power. In such arrangement the several loading or unloading devices will operate in proper timed relation to the several conveyers without danger or interference between the carriers and extensible element or section. Where a single loading or unloading station is provided at each floor or transfer point, power for actuating the movable section may be taken directly from the elevator chain.

Having described our invention what we claim as new and desire to protect by Letters Patent is:

1. The combination with a main conveyer and a branch conveyer, said branch conveyer being spaced from the main conveyer, of a movable section for bridging the gap between said branch conveyer and main conveyer and means for actuating said movable section comprising, a rotary, power-driven cam, connections between said cam and movable section, a lock for normally retaining said section in retracted position and means for releasing said lock to render said cam operative for actuating said section.

2. The combination with a main conveyer and a branch conveyer supplying articles to said main conveyer, said branch conveyer being spaced from the main conveyer, of a movable section for bridging the gap between said branch conveyer and main conveyer, said section being normally elevated in the path of said branch conveyer and means for actuating said movable section comprising, a rotary, power-driven cam, toothed members connecting said cam with said movable section, a lock for normally retaining said section in elevated position, means for releasing said lock to render said cam operative for actuating said section and a control for said last mentioned means having a member projecting in the path of the main conveyer.

3. Transfer apparatus for a conveyer comprising, a station having a tiltable section to receive the articles to be loaded, means for normally retaining one end of said section in elevated, inoperative position, said end being adapted to be lowered to operative position and means for raising said end from lowered, operative position to elevated, inoperative position comprising, a power-driven, rotary cam, connections between said cam and movable section and a releasable locking element operative only when said section is in elevated position.

4. Transfer apparatus for a conveyer having a carrier movable along a determined path comprising, a normally stationary loading station to receive the articles to be loaded, a movable section of said station arranged to receive the articles from said stationary section, and means for extending and retracting said section to and from said path comprising, a power-driven, rotary cam, connections between said cam and movable section, a lock for normally retaining said section in retracted position and an electrical control for said lock having an element projecting in the path of said carriers.

5. Transfer apparatus for a conveyer having a carrier movable along a determined path comprising, a station to receive the articles, a movable section of said station, and means for extending and retracting said section to and from said path comprising, a continuously operating, power-driven element, means for connecting said element with said movable section, a lock for normally retaining said section in retracted position and an electrical control for said connecting means and lock having an element projecting into the path of said carriers.

6. Transfer apparatus for a conveyer having a carrier movable along a determined path comprising, a station to receive the articles, a movable section of said station, and means for extending and retracting said section to and from said path comprising, a continuously operating, power-driven element, means for operatively connecting said element with said movable section, a lock for normally retaining said section in retracted position, a solenoid for actuating said lock and an electrical control for said solenoid having an element projecting into the path of said carriers.

7. Transfer apparatus for a conveyer having a carrier movable along a determined path comprising, a station to receive the articles, a movable section at said station, and means for extending and retracting said section to and from said path comprising, a continuously operating, power-driven element, a gear adapted to be driven by connection with said element but normally disconnected therefrom, means operatively connecting said gear with said movable section, means for rendering said gear operative, a solenoid for actuating said last mentioned means and an electrical control for said solenoid having an element projecting into the path of said carriers.

8. Transfer apparatus for a conveyer having a carrier movable along a determined path comprising, a station to receive the articles to be conveyed, a movable section at said station, and means for extending and retracting said section to and from said path comprising, a continuously operating, power-driven element, a gear adapted to be driven by connection with said element but normally disconnected therefrom, means operatively connecting said gear with said movable section, a lock for normally retaining said section in retracted position, means for rendering said gear operative, a solenoid for actuating said last mentioned means and an electrical control for said solenoid and lock having an element projecting into the path of said carriers.

9. Transfer apparatus for a conveyer having a carrier movable along a determined path comprising, a station for the articles to be conveyed, a movable section at said station, and means for extending and retracting said section to and from said path comprising, a continuously operating, power-driven element, a gear adapted to be driven by connection with said element but normally disconnected therefrom, a cam arranged to be actuated by said gear, means operatively connecting said cam with said movable section, means for rendering said gear operative, a solenoid for actuating said last named means, an electric circuit including said solenoid, and a switch included in said circuit and having an element projecting into the path of said carriers for controlling said solenoid.

10. Transfer apparatus for a conveyer having a carrier movable along a determined path comprising, a station, a movable section at said station, and means for extending and retracting said section to and from said path comprising, a continuously operating, power-driven element, a gear adapted to be driven by connection with said element but normally disconnected therefrom, a cam arranged to be actuated by said gear, means operatively connecting said cam with said movable section, a second cam actuated by said gear, means for rendering said gear operative, a solenoid for actuating said last mentioned means, a switch arranged to be actuated by said second cam, electric circuits including said solenoid and switch under control of said switch, and a second switch having an element projecting into the path of said carriers for controlling said solenoid.

In testimony whereof, we have hereunto signed our names to this specification.

JOHN CAESAR.
SMITH EGGLESTON.